(No Model.) 2 Sheets—Sheet 1.
R. C. KRUSCHKE.
PORTABLE BICYCLE SUPPORT.
No. 536,835. Patented Apr. 2, 1895.
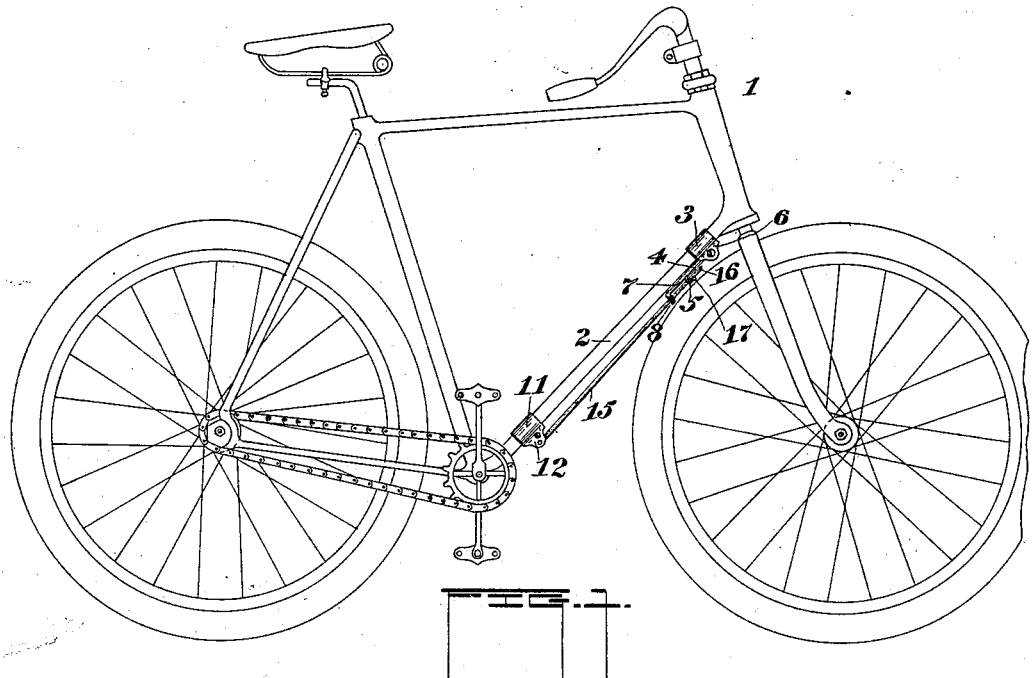
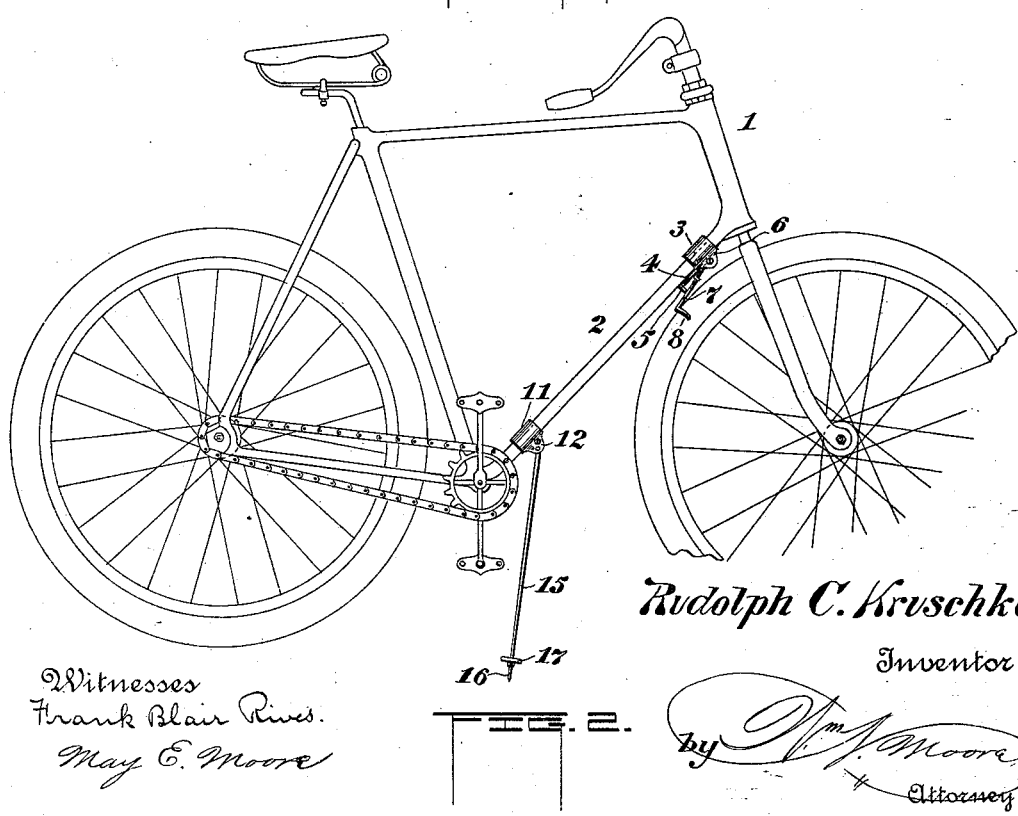
Witnesses
Frank Blair Rives.
May E. Moore
Rudolph C. Kruschke,
Inventor
by Wm. J. Moore
Attorney (No Model.) 2 Sheets—Sheet 2.
R. C. KRUSCHKE.
PORTABLE BICYCLE SUPPORT.
No. 536,835. Patented Apr. 2, 1895.
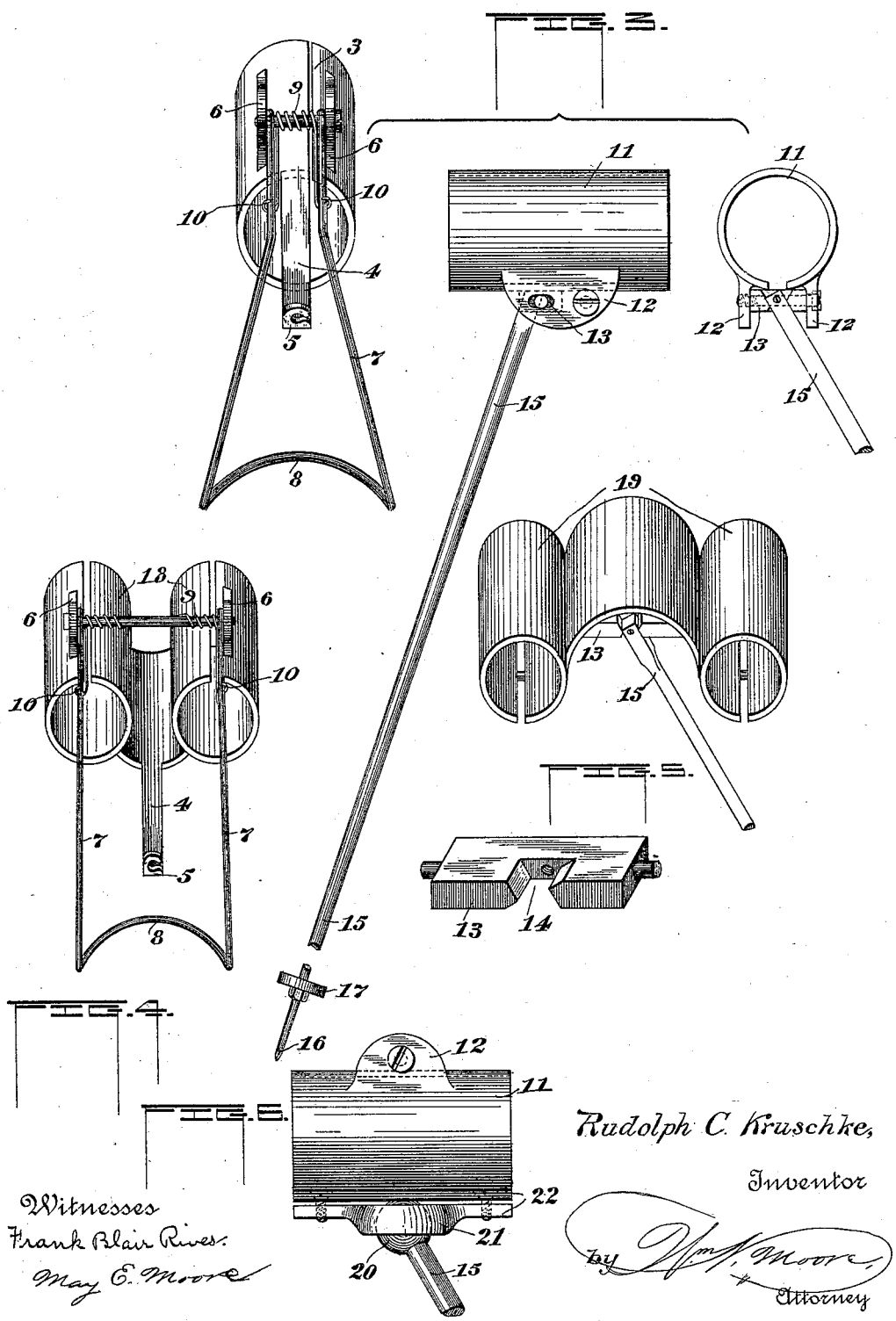
Witnesses
Frank Blair Rives
May E. Moore
Rudolph C. Kruschke,
Inventor
by Wm. N. Moore,
Attorney

UNITED STATES PATENT OFFICE.

RUDOLPH C. KRUSCHKE, OF DULUTH, MINNESOTA.

PORTABLE BICYCLE-SUPPORT.

SPECIFICATION forming part of Letters Patent No. 536,835, dated April 2, 1895.

Application filed May 9, 1894. Serial No. 510,637. (No model.)

*To all whom it may concern:*

Be it known that I, RUDOLPH C. KRUSCHKE, a citizen of the United States, residing at Duluth, in the county of St. Louis and State of Minnesota, have invented certain new and useful Improvements in Portable Bicycle-Supports; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in portable bicycle supports; and one object of my invention is the provision of a device of this character which will occupy but a small amount of space, which will not mar the appearance of the machine and which will be entirely out of the way of the rider.

Another object of my invention is the provision of a bicycle support which will properly support the wheel and which can be quickly adjusted and returned to its normal position.

Another object of my invention is the provision of a bicycle support which will consist of few parts thus insuring simplicity, durability and cheapness and which thus will possess all the requirements to render the invention practical and desirable.

To attain the objects stated the invention consists of a bicycle support embodying novel features of construction and combination of parts substantially as disclosed herein.

Figure 1 represents a side elevation of a bicycle with my support applied the support being in its normal position or that which it assumes when the wheel is ready for use or in use. Fig. 2 represents a side elevation of a bicycle provided with my support which is shown in the position it occupies when supporting or sustaining the wheel. Fig. 3 represents a perspective view of the parts of the supports detached on an enlarged scale to clearly show their peculiar construction. Fig. 4 represents a perspective view of the form of support used upon bicycles having a double connecting bar and Fig. 5 represents a detail view of this form of support to more clearly show its peculiar construction. Fig. 6 represents a detail view of a modified construction of supporting rod.

Referring by numerals to the drawings in which similar numerals of reference denote corresponding parts in the several views, the numeral 1 designates a bicycle of the type known as safety bicycles and which is provided with the lower inclined connecting bar 2, to which my improved support is applied. To the upper end of the connecting bar is applied the sleeve 3, which closely surrounds the bar and is provided with the arm 4, having the downward or upward extending hook 5, and is also provided with the lug 6, to which are pivoted the inner ends of the arms 7, of the bail or yoke having the curved bearing portion 8, which when the wheel is being supported bears upon the tire of the front wheel of the bicycle and these arms of the bail are normally pressed down by the action of the coiled spring 9, having the arms 10, engaging the arms of the bail, as clearly shown. To the lower portion of the connecting bar is connected the sleeve or ferrule 11, having the depending lugs or ears 12, between which is mounted the block 13, having a tilting or pivoted action upon the sleeve and provided with the reversely arranged inclined or angular recesses 14, in which is mounted the upper end of the supporting rod 15, having the pointed lower end 16, adjacent to which is the short steadying piece 17.

When the device is not in use the supporting rod or arm is elevated and the inner end rests in the hook of the arm carried by the upper sleeve and the spring bail bears upon the rod and holds it securely in the hook and when it is desired to adjust the rod to support the wheel it is simply necessary to detach the inner rod from the hook, lower it and turn it to one side when the upper end will bear against the inclined bearing of the block and hold the rod from movement and the spring bail carried by the upper sleeve will impinge or bear upon the tire of the wheel and act as a brake thereon and thus the wheel is prevented from moving and cannot fall over and thus a perfect support is insured.

In the form of my support shown in Figs. 4 and 5 which is constructed for use upon a wheel in which the frame has a double connecting bar the construction is substantially the same except that I use a double front sleeve 18, and a double back sleeve 19, but the operation of the device is exactly the same as the form before described.

In the form of supporting bar shown in Fig. 6 I form the bar with a ball 20, at the upper end mounted in a socket bearing 21, of the two plates 22, which are secured to the connecting bar in any desired manner.

I have shown what I consider the best forms or constructions of my support but I would have it understood that many minor changes in the details of construction may be made without departing from the spirit or scope of my invention and without affecting its efficiency and I reserve the right to make any such changes.

I claim—

1. In a bicycle support, the combination of the connecting bar, the upper sleeve connected to the bar, the retaining arm carried by the sleeve, the lower sleeve, the supporting bar pivoted to said sleeve and adapted to be retained when out of use by the retaining arm of the upper sleeve and the spring bail on the upper sleeve adapted to hold the supporting rod in the hook when not in use and to bear upon the wheel when the supporting rod is in use, in the manner described.

2. In a bicycle support, the combination with the frame, the upper sleeve having the retaining arm, the hook on said arm, and the pivoted supporting rod adapted to be engaged and retained by the hook on said arm and the spring bail on the upper sleeve adapted to hold the supporting rod in the hook when not in use and to bear upon the wheel when the supporting rod is in use, in the manner described.

3. In a bicycle support, the combination of the sleeve, a bail pivoted to said sleeve, and the coiled spring bearing upon the arms of the bail and causing them to bear upon the wheel and serve as a brake.

4. In a bicycle support, the combination of the sleeve, the pivoted block carried by said sleeve, the angular or inclined stops or abutments, and the rod pivoted in the block and adapted to rest upon the said stops or abutments when in use.

5. In a bicycle support, the combination with the sleeve having the arm formed with a hook, the spring controlled bail connected to said sleeve, the sleeve having the pivoted block, and the supporting rod pivoted to said block and adapted to be retained in position by said block when in use and by the hooked arm when not in use, in the manner described.

6. In a bicycle support, the combination of the double connecting bar, the upper sleeves thereon, the retaining arm carried by said sleeves, the spring bail carried by said sleeves, the lower sleeves, the pivoted block mounted in the lower sleeves, and having the stops or abutments, and the supporting rod pivoted to the block between the stops and adapted to be retained in position by the stops when in use and by the retaining arm of the upper sleeves when not in use.

In testimony whereof I affix my signature in presence of two witnesses.

RUDOLPH C. KRUSCHKE.

Witnesses:
THEO. HOLLISTER,
LELIA W. BROWN.